Figure 1:
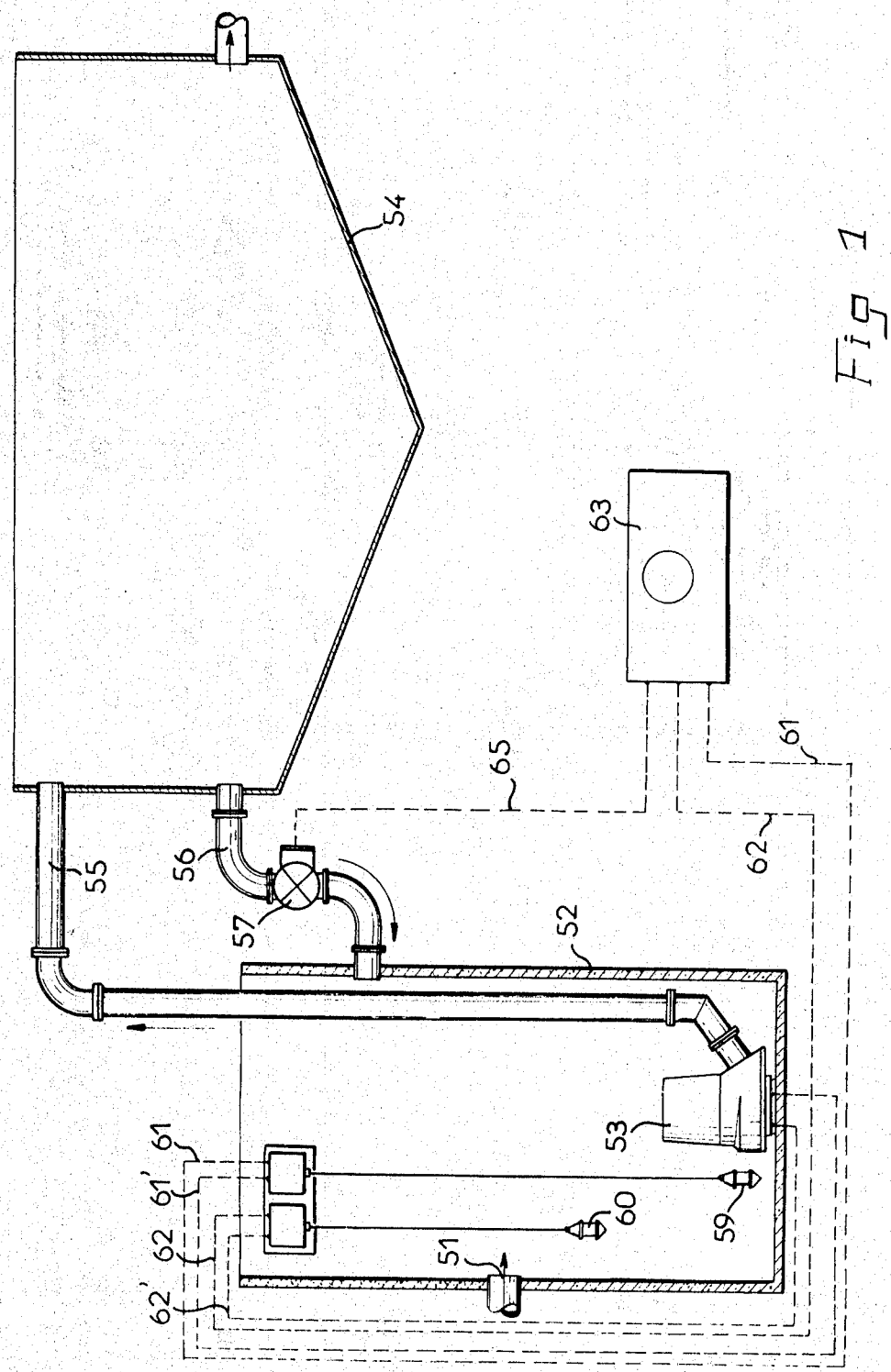

United States Patent

[11] 3,563,382

[72] Inventor Jean Joseph Regent
Nantes, France
[21] Appl. No. 782,817
[22] Filed Dec. 11, 1968
[45] Patented Feb. 16, 1971
[73] Assignee Compagne D'Etudes Et De Recherche Des Services Operationnels D'Assainissement in France-Compagnie S D A F
Issy Les Moulineaux (Seine), France
[32] Priority Dec. 12, 1967
[33] France
[31] 131,846

[54] SEWAGE TREATMENT PLANTS
1 Claim, 2 Drawing Figs.
[52] U.S. Cl. ..................................................... 210/124, 210/138, 210/195
[51] Int. Cl. ..................................................... B01d 21/10
[50] Field of Search .......................................... 210/104, 105, 138, 124, 195—197

[56] References Cited
UNITED STATES PATENTS
| | | | |
|---|---|---|---|
| 1,820,977 | 9/1931 | Imhoff | 210/195 |
| 2,574,685 | 11/1951 | Baxter et al. | 210/195 |
| 3,207,313 | 9/1965 | Schulze | 210/195 |
| 3,242,071 | 3/1966 | Walker | 210/138X |
| 3,397,789 | 8/1968 | Valdespino | 210/195X |

Primary Examiner—John Adee
Attorney—Christen & Sabol

ABSTRACT: An automatically regulated plant for the treatment of sewage comprises a primary feeding tank for receiving liquid raw sewage, a pump immersed in said primary tank to feed the plant with the liquid discharged in the tank, means for controlling the operation of the pump, at least one digester with biologically active filter bed, means to convey a certain amount of the outflow of the treated effluent from said digester to the primary feeding tank, a valve for controlling the flow of the recirculated effluent, a program timer correlated with the means to control the operation of the pump and adapted to actuate the recirculation valve and to cause said valve to be driven into its open position after expiration of a delay period following the stopping of the pump.

SEWAGE TREATMENT PLANTS

The present invention relates to biologically active plants for the treatment of raw sewage.

It is known that in plants of the above type the effluent after appropriate treatment is subjected to a partial recirculation so as to allow:

the sludge to be discharged and conveyed to the digester;
the biologically active bed to be continuously cleansed due to the hydrostatic pressure in it; and
the final effluent to be discharged (for instance to a stream) after sufficient cleansing and as a clear, relatively harmless liquid.

It is fairly simple to time the recirculation flow; for instance if the raw sewage and treated effluent pour in a common tank where an immersed pump is adapted to feed the plant with the mixed liquid the starting and stopping of this pump can be controlled by a clock. However this device is only valid under these conditions that the inflow of raw sewage is nearly constant.

As a matter of fact these conditions rarely occur; the above device lacks flexibility and is not adapted to the various changes in the inflow of raw sewage, both according to the hour of the day and according to the season of the year.

Since the recirculation flow is independent of the sewage inflow it will be often either insufficient when the sewage inflow is low, or in excess when the sewage inflow is subject to a considerable and quick increase.

It is desirable for the sewage treatment plants with a biologically active filter bed, to work with the following conditions:
1. The flow of liquid with which the plant is fed during a period of time is maintained to an amount corresponding to the optimal flow calculated for the plant, considering the biological and hydraulic conditions.
2. This optimal flow should be maintained irrespective of the inflow of the raw sewage conveyed to the plant by the sewer network, i.e. irrespective of the total amount of raw sewage discharged to the plant during the same day and irrespective of the head flow arriving in the plant.
3. This optimal flow should be constant so that the plant is fed as regularly as possible.

To have these conditions complied with it is necessary for the treated effluent to be recirculated with a flow adapted to the amount of raw sewage discharged by the sewer network, the flow of recirculated effluent being inverse of the amount of raw sewage pouring into the feeding tank.

Some devices are known that intend to obtain the desired result above:
1. The starting and stopping of the pump is controlled by a clock as indicated above; such a device entails these disadvantages that the flow of recirculated effluent is constant irrespective of the flow of raw sewage whereas the desired result is to cause the flow of recirculated effluent to increase when the inflow of raw sewage decreases and vice versa.
2. In other plants a float device in the feeding tank actuates the opening and closing of the valve controlling the recirculation of the treated effluent; however in such devices the total amount of recirculated effluent is out of control and furthermore the flow of liquid pumped in the feeding tank and conveyed in the plant is not regulated.
3. The valve may be actuated by a special float device so that the recirculation valve is opened as soon as the immersed pump in the feeding tank stops and it is driven to its closed position when the liquid in the feeding tank has reached a level corresponding to the float device; then since the recirculation valve is closed, the further filling of the feeding tank results from the pouring in of the raw sewage along until the liquid reaches an upper float device actuating the starting of the pump; in this device a lower float actuates the stopping of the pump, the special float device actuating the recirculation valve being situated at a level intermediary between the lower and upper floats adapted to actuate the starting and stopping of the pump.

This device, though it is more convenient than the ones previously specified, does not completely fulfill the requirement; the recirculation is takes place even though the inflow of raw sewage has increased to a high value; on the contrary when the inflow of raw sewage has stopped for some time the filling up of the feeding tank does not allow the liquid to reach the upper float device so that the pump is not actuated and the plant is not fed with liquid to be treated. Further it is necessary in such a device to modify the regulation of the system (i.e. the level of the intermediary float in the feeding tank) if and when the flow of raw sewage turns out to change.

It is an object of this invention to provide a sewage treatment plant with a biologically active filter bed that obviates the disadvantages of the known plants.

Other objects and advantages of the invention will be apparent from the following description taken in conjunction with the accompanying drawing in which:

FIG. 1 is a largely schematic view representing a vertical cross section through a digester and a primary feeding tank embodying the major features of this invention; and sewage disposal unit according to the invention.

As seen in FIG. 1, the present invention relates to an automatically regulated plant for the treatment of sewage comprising a primary feeding tank 52 for receiving liquid raw sewage via 51, a pump 53 immersed in said primary tank to feed the plant via 55 with the liquid discharged into the tank, means for controlling operation of the pump, at least one digester 54 with a biologically active filter bed, means 56 to convey a certain amount of the outflow of the treated effluent from said digester 54 to the primary feeding tank 52, a valve 57 controlling the flow of recirculated effluent, a program time 63 correlated via 61 and 62 with the means to control the operation of the pump and adapted to actuate via 65 the recirculation valve 57 and to cause said valve to be driven in open position after expiration of a delaying period following the stopping of the pump.

Means for controlling the operation of the pump 53 consist of two float devices as specified above; the upper float device 60 causes the pump 53 to start via 62' and the lower float device 59 actuates the stopping of the pump 53 via 61'.

Accordingly when the level of the liquid in the primary feeding tank 52 has reached the level of the upper float device 60 the pump 53 starts and the primary tank is discharged until the level of the liquid has reached the lower float device 59 which results in the stopping of the pump 53.

The program timer 63 is correlated with the operation of the pump; the delay period begins with the stopping of the pump, and at the end of this delay period the program timer actuates the opening of the recirculation valve 57.

The program timer 63 is correlated with the means for controlling the operation of the pump so that it causes the recirculation valve to be closed when the pump starts and the program timer is so arranged that it returns automatically to zero in the case that before expiration of the delay period, the liquid in the feeding primary tank due to the inflow of raw sewage in 51, has reached the level of the upper float device 60 corresponding to the starting of the pump.

According to the invention, the smaller is the inflow of raw sewage 51, pouring into the primary tank 52, the less quickly the liquid in said primary tank will reach to the level of the upper float device 60 causing the pump to start; accordingly the program timer 63 will, after expiration of the delay period, allow the recirculation valve 57 to be opened and the outflow of recirculated treated effluent to fill the primary tank 52.

Even though the inflow of raw sewage turns out to be zero, the recirculated effluent will fill up the primary tank so as to avoid the plant not to be fed.

On the contrary in the event that the inflow of raw sewage becomes greater it will more quickly fill up the primary tank, and when the program timer actuates the recirculation valve, the primary tank will be almost filled up so that the recirculation will take place but for a short period of time, until the starting of the pump causes the recirculation valve to be closed. It may occur that the inflow of raw sewage is so great that the primary tank is filled up before the delay period has come to an end; accordingly the pump starts without the effluent having been allowed to be recirculated.

It is understood that in such a device the flow of recirculated effluent is inversely proportional to the flow of raw sewage, which corresponds to the desired operative conditions of the plant.

Figure 2:
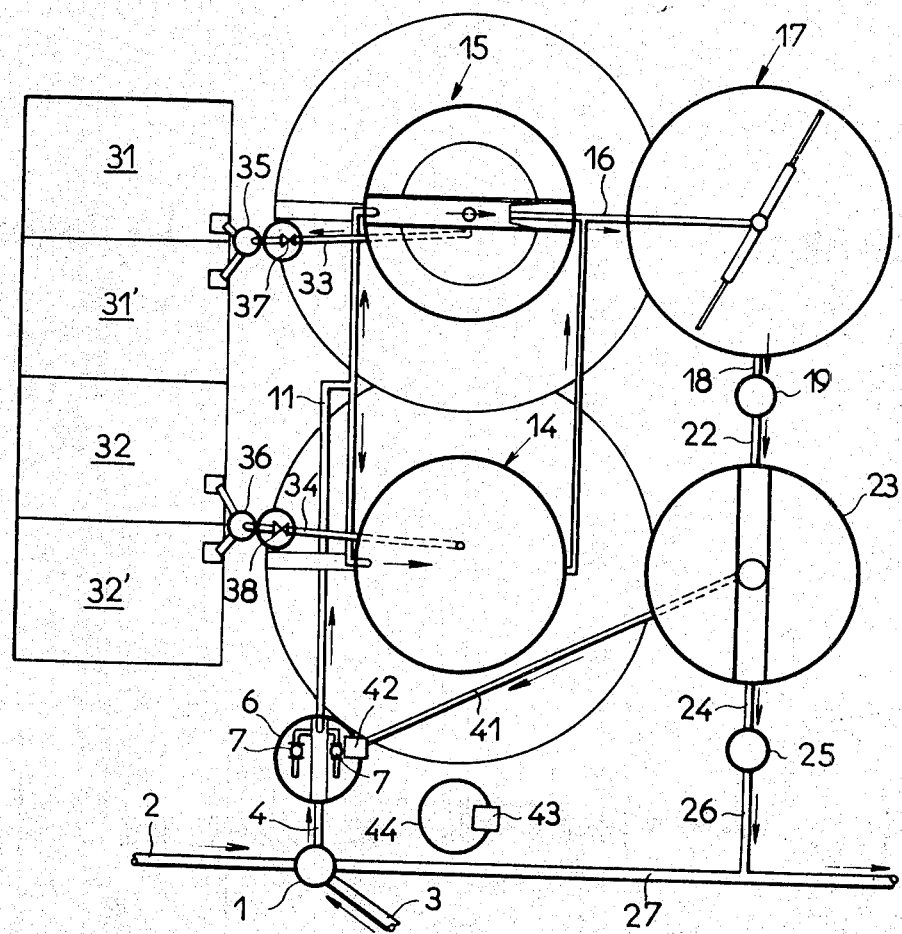

In FIG. 2, the raw sewage is conveyed by the sewer pipes 2 and 3 with the man hole 1 and pours into the primary feeding tank 6 in which are immersed the pump 7, which pumps convey the liquid of the primary tank to the tanks 14 and 15 through the pipe 11; hence the pipe 16 conveys the liquid to the biologically active filter bed 17, from which the liquid is directed to the decanter 23, through the pipes 18 and 22 with a man hole 19; the pipe 24 with a further man hole 25 conveys the effluent as a relatively clear liquid to the outflow pipe 27 receiving the overflow from the hole 1.

The plant comprises a set of sludge areas 31 and 32 receiving the sludge from the tanks 14 and 15 respectively through the pipes 33 and 34 with the valves 37 and 38 and the man holes 35 and 36.

The recirculation of the treated effluent is provided by the pipe 41 coming from the decanter 23 and discharging said effluent in the primary tank 6 through the recirculation valve 42. This valve 42 is under control of the program timer 43 which is electrically bound to the pump operation control device, so that the recirculation valve is actuated into its open position after a predetermined delay following the stopping of the pumps.

After the expiration of this delay period the valve 42 is caused to be opened and remains so as long as the pumps remain out of operation; as soon as the level of the liquid in the primary tank brings about the starting of the pumps the recirculation valve 42 is caused to be driven into its closed position.

I claim:

1. In an automatically regulated plant for the treatment of sewage comprising: a primary feeding tank for receiving liquid raw sewage; at least one digester with a biologically active filter bed; a pump immersed in said primary tank to feed the digester with the liquid discharged in the tank; float means for controlling the operation of the pump, said float means being adapted to stop the pump when the sewage level in said primary feeding tank reaches a predetermined lower level and to start the pump when the sewage level in said primary tank reaches a predetermined upper level higher than said predetermined lower level; means to recirculate a portion of the outflow of the treated effluent from said digester to the primary feeding tank; and a valve controlling the flow of recirculated effluent, the improvement which comprises a program timer correlated with the float means and actuating the recirculation valve for closing the valve when the float means starts the pump and for opening the valve at the expiration of a determined delay period following the last stopping of the pump, the program timer being returned to zero by the float means when said float means starts the pump, whereby if the float means has restarted the pump before the expiration of the determined delay period, the timer will allow the valve to remain open.